United States Patent
Steeves et al.

(10) Patent No.: US 9,800,556 B2
(45) Date of Patent: Oct. 24, 2017

(54) SYSTEMS AND METHODS FOR PROVIDING DATA SECURITY SERVICES

(71) Applicant: DocuSign, Inc., San Francisco, CA (US)

(72) Inventors: David Steeves, Bainbridge Island, WA (US); Eric Fleischman, Redmond, WA (US)

(73) Assignee: DocuSign, Inc., San Francisco, CA (US)

( * ) Notice: Subject to any disclaimer, the term of this patent is extended or adjusted under 35 U.S.C. 154(b) by 28 days.

(21) Appl. No.: 14/610,869

(22) Filed: Jan. 30, 2015

(65) Prior Publication Data

US 2016/0226830 A1 Aug. 4, 2016

(51) Int. Cl.
H04L 29/06 (2006.01)
H04L 9/08 (2006.01)

(52) U.S. Cl.
CPC ........ H04L 63/0428 (2013.01); H04L 9/0894 (2013.01); *H04L 2209/76* (2013.01)

(58) Field of Classification Search
CPC . H04L 63/04; H04L 63/0428; H04L 63/0471; H04L 63/0281; H04L 9/0822; H04L 63/166; H04L 2209/76; H04L 9/0894; G06F 21/602; G06F 21/606
USPC ......................................................... 713/153
See application file for complete search history.

(56) References Cited

U.S. PATENT DOCUMENTS

| | | | | |
|---|---|---|---|---|
| 2003/0217258 | A1* | 11/2003 | Bade | H04L 63/0442 713/150 |
| 2007/0258468 | A1* | 11/2007 | Bennett | H04L 63/0464 370/400 |
| 2012/0216041 | A1* | 8/2012 | Naono | H04L 9/0894 713/171 |
| 2014/0229732 | A1 | 8/2014 | Roth et al. | |

FOREIGN PATENT DOCUMENTS

WO WO-2016122646 A1 8/2016

OTHER PUBLICATIONS

"International Application Serial No. PCT/US2015/013930, International Search Report mailed Jan. 28, 2016", 2 pgs.
"International Application Serial No. PCT/US2015/013930, Written Opinion mailed Jan. 28, 2016", 5 pgs.
"International Application Serial No. PCT/US2015/013930, International Preliminary Report on Patentability dated Aug. 10, 2017", 7 pgs.

* cited by examiner

*Primary Examiner* — Yogesh Paliwal
(74) *Attorney, Agent, or Firm* — Schwegman Lundberg & Woessner, P.A.

(57) ABSTRACT

Embodiments described herein provide enhanced computer- and network-based systems and methods for providing data security with respect to computing services, such as a digital transaction service (DTS). Example embodiments further provide a discovery service that enables nodes that are included in, or otherwise communicatively coupled to, the DTS to actively or passively "discover" roles and keys associated with the nodes. These node roles are associated with the various services provided by the DTS. A security module provides at least a portion of the security services.

9 Claims, 11 Drawing Sheets

Discovery Manifest

Published: Timestamp_1

Period of Validity: (Timestamp_2, Timestamp_3)

Number of Nodes: N

| Node # | Node ID/Address | Node Roles | Access Control List (ACL) | Node Public Keys |
|---|---|---|---|---|
| 1 | ID(1) | ROLE(1) | ACL(1) | PuK(1) |
| 2 | ID(2) | ROLE(2) | ACL(2) | PuK(2) |
| 3 | ID(3) | ROLE(3) | ACL(3) | PuK(3) |
| ... | ... | ... | ... | ... |
| N | ID(N) | ROLE(N) | ACL(N) | PuK(N) |

Discovery Server Signature

*FIG. 2A*

Discovery Client_i (DC_i)

*DC_i Private Key Storage*

PrK(DC_i)

*DS Public Key Storage*

PuK(DS)

| Client ID/Address | Client Roles | ACL | Client Public Key Storage | Session Key Storage |
|---|---|---|---|---|
| ID(DC_1) | ROLE(DC_1) | ACL(1) | PuK(DC_1) | SK(DC_i, DC_1) |
| ID(DC_2) | ROLE(DC_2) | ACL(2) | PuK(DC_2) | SK(DC_i, DC_2) |
| ID(DC_3) | ROLE(DC_3) | ACL(3) | PuK(DC_3) | SK(DC_i, DC_3) |
| ... | ... | ... | ... | ... |
| ID(DC_N) | ROLE(DC_N) | ACL(N) | PuK(DC_N) | SK(DC_i, DC_N) |

*FIG. 2B*

SYSTEMS AND METHODS FOR PROVIDING DATA SECURITY SERVICES

FIELD OF THE INVENTION

The present disclosure relates to systems and methods for computer security and, more particularly, to systems and methods for providing data security with respect to a managed infrastructure security system.

BACKGROUND

A common refrain heard among customers when evaluating new critical Software as a Service (SaaS) platforms is a lack of trust in the service. For example, to receive services, the customer is often required to transmit sensitive data to the service provider via a computing network. The customer must trust the service provider and the associated computer network to provide adequate safeguards and security measures to protect the sensitive data. This lack of trust creates a significant adoption barrier for new services. Service providers must combat this by articulating how secure their service is and attempting to prove it to customers in a myriad of ways. Furthermore, the security measures must reduce latency while not otherwise hindering the performance or efficiencies of the provided services.

BRIEF DESCRIPTION OF THE DRAWINGS

Preferred and alternative examples of the present invention are described in detail below with reference to the following drawings:

FIG. 2A is a block diagram of an example embodiment of discovery manifest;

FIG. 2B is a block diagram of a storage portion of a discovery client included in a service node of the service cluster;

DETAILED DESCRIPTION

Figure 1A:
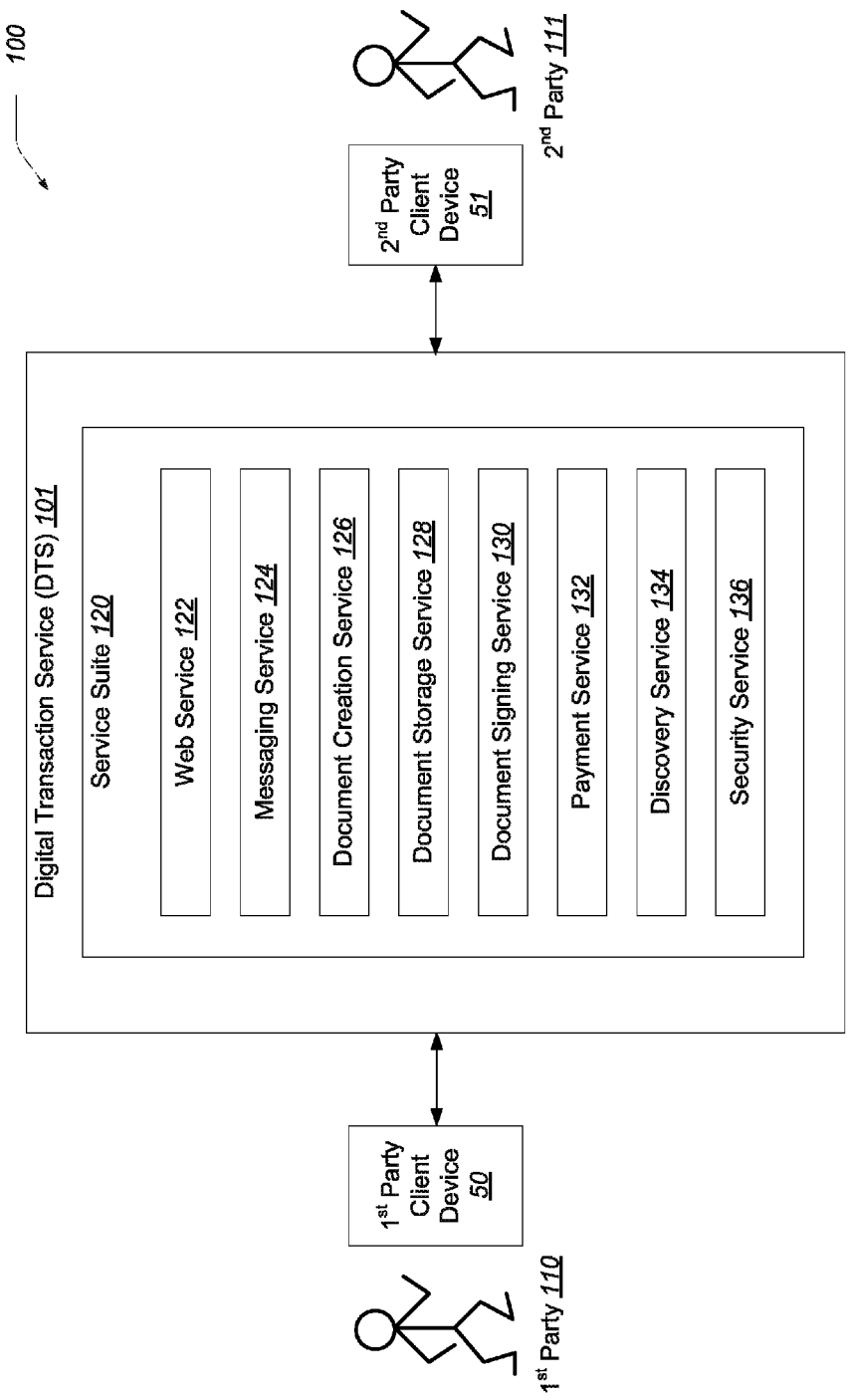
FIG. 1A is a block diagram of an example embodiment of a digital transaction service (DTS)

Embodiments described herein provide enhanced computer- and network-based systems and methods for providing data security with respect to computing services, such as a digital transaction service (DTS). Example embodiments further provide a discovery service that enables nodes that are included in, or otherwise communicatively coupled to, the DTS to actively or passively "discover" roles associated with the nodes. These node roles are associated with the various services provided by the DTS. The roles may map the authorization to various resources.

The discovery service includes a discovery server and at least one discovery client. Each of the discovery clients is associated with a particular node that communicatively coupled to DTS. For instance, each of the service nodes associated with the DTS may include a discovery client. The discovery server publishes a discovery manifest. The discovery clients and associated service nodes are provided access to discovery data via the manifest. The discovery server may publish the discovery manifest via either a push service, a pull service, or a combination thereof.

The discovery data includes the roles or services that are assigned to each of the service nodes. Accordingly, the discovery manifest maps roles to particular nodes, machines, or clients, as well as assigns relationships between the nodes. The discovery data embedded in the discovery manifest may also include node addresses and access control lists (ACLs). For at least a portion of the nodes that are provided the discovery manifest, an asymmetric encryption/decryption key pair is associated with each particular node in the portion. The key pair includes a public key and a private key that are each associated with the node and/or the associated discovery client. A public and private key pair is also associated with the discovery server.

In some embodiments, the discovery manifest includes a digital signature associated with the discovery server or some other trusted authority. The signature enables each of the discovery clients to determine the authenticity and the fidelity/integrity of the discovery data included in the signed manifest. In such embodiments, each of the discovery clients is provided the discovery server's public key through an exchange of data other than the discovery manifest. Furthermore, the manifest includes the service nodes' public keys. Thus, each service node may "discover," or otherwise be provided the public keys for each of the other nodes. In at least one embodiment, the discovery manifest is provided in an encrypted format. For instance, the discovery server may provide an encrypted discovery manifest to a particular service node. The encrypted discovery manifest is encrypted with the particular service node's public key. The particular service node may decrypt the encrypted discovery manifest by employing its own associated private key.

Example embodiments enable the secure, efficient, and persistent transmission of data or messages between the nodes. For example, two nodes may securely exchange data indefinitely, while minimizing computationally expensive asymmetric encryption steps. Furthermore, such embodiments eliminate the need for inefficient "handshakes" between the communicating nodes, or with other nodes that "manage" or otherwise enable the communication between nodes, such as an authentication server.

For two nodes in communication, these embodiments provide a "session" key associated with a "communication session" between the first and second nodes. Nodes that have access to the session key may readily encrypt and decrypt data with the session key, or at least be provided an encryption/decryption service via a cryptographic service provider, such as a security module. Data exchanged between the first and the second nodes is first encrypted with the session key, then transmitted from one node to the other, and when received, decrypted with the session key. Once decrypted, the receiving node may utilize the received data.

In a preferred embodiment, the session key is a symmetric session key. However, in other embodiments, the session key may include an asymmetric key pair. A separate session key is associated with each pair of nodes that are exchanging data via a secure session. For instance, a first session key is associated with a first session between a first node and a second node. A second session key is associated with a second session between the first node and a third node. In at least one embodiment, multiple sessions may be associated with a particular pair of node, such as a third session (and third session key) associated with the first and the second nodes.

Access to a particular session key may be limited to the two particular nodes that are associated with the particular session. In at least some embodiments, no other nodes are provided access to the particular session key associated with the two particular nodes. Accordingly, nodes that are not associated with a particular session may not access, or at least utilize, the data exchanged during a particular session.

In reference to the above first, second, and third nodes, the first session key is provided to the first and second nodes, but not to the third node. Likewise, the second session key is provided to the first and third nodes, but not to the second node. By employing the first session key, the first node may securely provide an encrypted first message to the second node. Because the third node cannot decrypted the first message, the third node cannot utilize information included in the first message. Likewise, by employing the second session key, the first node may securely provide a second encrypted message to third node, wherein the second node cannot decrypt the second message.

Each of the two nodes associated with a particular session stores the particular session key for subsequent use. Because no other nodes have access to the first session key, each of the first and the second nodes stores and employs the first session key to securely exchange subsequent data indefinitely, or at least for the duration of the first session. Likewise, the first and third nodes store and continue to employ the second session key for subsequent data exchanges.

A session need not be limited to a predetermined time period, nor a predetermined number of data exchanges between the two nodes. However, in some embodiments, the validity of a session key is associated with a finite lifetime. The lifetime may be measured in units of time, number of data exchanges, total amount of data transmitted between the two nodes, or any other pertinent metric. In other embodiments, a session key does not expire unless the DTS expressly discards or otherwise invalidates the session key. In the event of a security breach isolated to particular nodes, the DTS only needs to invalidate the session keys associated with the breached nodes. For example, in the event of a security breach isolated to the above referenced third node, the DTS may invalidate the second session and second session key, while maintain the security of the first session.

Each session between two particular nodes begins with an initial message. The first node (or sender) sends, or at least initiates the sending of, the initial message to the second node (the recipient). The initial message includes encrypted payload data and the encrypted session key. In the initial message, the payload data is encrypted with the particular session key associated with the particular session between the first and second nodes. When the session key is a symmetric key, the payload data is symmetrically encrypted. Otherwise, the payload data is asymmetrically encrypted. In contrast to the encrypted payload data, the particular session key included in the initial message is encrypted with a key other than the session key. In a preferred embodiment, in the initial message, the session key is asymmetrically encrypted with the second node's public key. However, other keys may be used to symmetrically or asymmetrically encrypt the session key in the initial message. In at least one embodiment, the initial message does not include payload data, but rather includes only the encrypted session key.

In regards to the initial message, the first node may provide and/or perform the symmetric encryption of the payload data. Furthermore, the first node may provide and/or perform the asymmetric encryption of the session key. In such embodiments, the first node generates the session key prior to providing it in the initial message. In other embodiments, as discussed below, a cryptographic workhorse provides encryption/decryption and/or key generation services. For example, a key manager included in the cryptographic workhorse may generate and provide the session key to the first node by encrypting the session key using the first node's public key.

In at least one embodiment, a trusted party signs the initial message. For instance, the initial message may be signed by the first node, the discovery server, a security module, or a trusted third party. In at least one embodiment, the initial message is signed based on the first node's private key. The signing of the initial message may be based on an asymmetric encryption. The initial message is signed so that the source and integrity of the initial message may be verified prior to the second node's reliance upon the data included in the initial message. In some embodiments, the second node may verify the authorization by employing the discovery manifest. The second node may veto, discard, or request a re-sending of the initial message if the second node cannot verify that at least a portion of the data included in the initial message originated from the first node. In some embodiments, at least one subsequent message between the first and the second nodes is symmetrically signed by employing the session key. Each message between the first and second nodes may be signed by employing at least asymmetric or symmetric encryption.

When received, the second node's private key is employed to asymmetrically decrypt the session key. The payload data may then be decrypted using the decrypted session key. When decrypting the payload data, computational resources are saved when the session key is a symmetric key. In some embodiments, the second node performs that decryption of both the session key and the payload data. The second node is provided the session key by decrypting the session key with its own private key. Nodes without access to the second node's private key cannot obtain access to the session key.

The second node stores, or caches, the session key to use in subsequent data exchanges between the first and the second nodes. In other embodiments a cryptographic workhorse, or security module, provides decryption services and/or key storage service to the second node. For future data transmissions, additional payload data is encrypted with the session key. The encrypted additional payload data is provided to the first or second node in a subsequent message.

Upon receiving the subsequent message, the second node employs the locally cached session key to decrypt the additional payload data. Encrypting/decrypting this additional payload data by employing a symmetric session key is more efficient than encrypting the data with an asymmetric session key. Accordingly, when a symmetric session key is employed, computationally expensive asymmetric encryption/decryption steps are not required to enable these subsequent data exchanges. Furthermore, handshakes and/or key exchanges between the two nodes, or between the nodes and an authentication server, are not required to persistently maintain the security of the session.

The first node also locally stores, or caches, the session key so that subsequent data exchanges may be two-way, or bi-directional, data exchanges. Accordingly, once each of the first and the second nodes have access to the session key, a bi-directional, persistent, and secure data exchange session is established between the nodes. Furthermore, the transmission of the initial payload data is used to provide proactive authorization for the session. Accordingly, the need for a third node, such as an authorization server or module, to establish the session between the first and the second nodes is mitigated.

In at least some embodiments, the communicating nodes generate the session keys, as well as store the session keys and perform the initial encryption/decryption of the session key and subsequent encryption/decryption of the initial and subsequent payload data associated with the session. Such embodiments enable the direct exchange of secured data between the two nodes, while limiting the distribution of the session keys. In other embodiments, at least a portion of the cryptographic services are provided by another node or module, such as a key manger, a cryptographic workhorse, or security module.

In various embodiments, each node includes a key cache module to locally store or cache the various symmetric session keys that the node employs to communicate with each of the other nodes. In a preferred embodiment, the session keys are stored in a decrypted format. However, in at least one embodiment, the session keys are stored in a symmetrically or asymmetrically encrypted format. In this embodiment, the session key must be decrypted prior to each use.

In a preferred embodiment, a session key is a unidirectional session key such that bidirectional communication between two nodes involves two separate and distinct unidirectional session keys. For instance, node_A transmits key_A to node_B, where the transmitted key_A is encrypted using the public key of node_B. When node_A transmits subsequent messages with payload data encrypted with key_A, node_B may employ a cached copy of key_A to decrypt the payload data.

Likewise, node_B may transmit key_B to node_A, where the transmitted key_B is encrypted using the public key of node_A. Node_B may provide additional payload data, that is encrypted with key_B to node_A. Payload data provided from node_A to node_B is encrypted with the unidirectional symmetric key_A. Payload data provided from node_B to node_A is encrypted with the unidirectional symmetric key_B. Each of node_A and node_B caches or otherwise stores copies of key_A and key_B for subsequent use. Using symmetric keys for each of unidirectional session keys, key_A and key_B reduces latency in the system.

Likewise, nodes that are external to the DTS may securely and persistently exchange data with the nodes internal to the DTS, by similarly establishing a secure session. Such external nodes may be under the control or management of parties external to the DTS. For instance, an external node may provide an initial message that includes an encrypted session key to a node in the DTS. Likewise, an internal node may transmit an initial message including an encrypted session key to an external node. Both the internal and external nodes store the decrypted session keys.

An external party, such as a customer of the DTS, may provide public keys associated with the external nodes by establishing a user account with the DTS. The external public keys may be stored via the external party's user account settings. An external key manager, associated with the external nodes, may be provided the discovery server's public key. The discovery server provides the public keys associated with the internal nodes in a similar manner as the internal nodes are provide the internal public keys. In at least one embodiment, the external key manager is provided the discovery manifest, or at least a redacted version of the discovery manifest that includes the public keys for the internal nodes. A persistently secure session between an internal/external node pair may be established in a manner that is similar to that detailed above for sessions between internal node pairs. Furthermore, external nodes may be assigned roles through the discovery manifest.

As noted throughout, for at least some embodiments, a cryptographic workhouse manages the secure sessions or provides at least some of the cryptographic services required to establish and maintain the secure session between the internal and the external nodes. The cryptographic workhorse may be a security module included in a security service.

In a preferred embodiment, the security module is operated by a trusted third party that is external to both the DTS and a user and/or customer of the DTS. A customer side loads, or otherwise provides the external security module with keys that are associated with nodes that are controlled by the customer. In preferred embodiments, these sideloaded keys include symmetric session keys or private keys. However, in other embodiments, the customer may supply public keys to the security module. The public keys may be provided by a customer controlled key manager. In this way, the DTS never has access to the customer's public keys.

The customer may provide the DTS a document to be stored in an encrypted state. However, the DTS does not non-volatilely store the document in an un-encrypted state. Rather, the DTS provides the document to the security module to be encrypted. The security module encrypts the document with a key associated with at least one of the customer, the document, or the DTS. The associated key may be a symmetric or an asymmetric key. As discussed further below, the security module also provides decryption services to provide the customer a decrypted version of the document via the DTS. However, as noted throughout, at no point does the DTS store a decrypted version of the document.

The security module provides the encrypted document to the DTS. Upon which the DTS stores the document that is encrypted with the associated key. Accordingly, the DTS only stores the encrypted version of the document. At no time is the DTS provided access to the associated key that is required to decrypt the encrypted document that is stored in non-volatile memory. Because the DTS does not have access to the associated key and does not non-volatilely store the un-encrypted document, the DTS does not have subsequent access to the unencrypted document. In at least one embodiment, the customer is provided access to the associated key.

In at least one embodiment, the customer provides the document to the DTS, wherein the provided document is already encrypted with the associated key. For instance, a key manager, under the control of the customer, may have generated the session key and the customer has encrypted the document prior to providing the document to the DTS.

In scenarios where the customer (or another authorized party) requests access to the stored document, the security module may request access to the document's associated key from the customer's key manager. In various embodiments, the DTS may act as an intermediary between the security module and the customer for such key requests. However, as discussed below, the DTS is only provided access to an encrypted version of the associated key (or a seed used to generate the associated key). The DTS does not have access to the key that is required to decrypt the associated key, as the key to the associated key has been provided to the security module via a customer side loading, or other means to provide the key to the security module that does not include the DTS.

In response to a security module (or DTS) initiated key request to the customer, the customer provides a message to the DTS. The message includes at least the associated key, wherein the associated key is encrypted with another key that is not accessible by the DTS. This other key may be a key that the customer had previously provided to the security module, such as a private or public key associated with a node managed by the customer. However, the trusted security module has access to this other key. For instance, the customer may have previously side loaded this other key to the security module. In at least one alternative embodiment, rather than the message including an encrypted associated key, the message includes a seed, wherein the associated key may be generated based on the seed. The seed included in the message may be in an encrypted or decrypted format.

In at least one preferred embodiment, this message is signed by employing a private key associated with the customer. The DTS may then provide the security module with both the associated key (that is encrypted with the other key) and the document that is encrypted with the associated key. The security module may verify the authenticity of the message, originating from the customer via the included signature. When authenticated, the security module performs the symmetric or asymmetric decryption and provides via the associated key. The security module may store or cache the associated key for subsequent use. In other embodiments, the security module requests access to the associated key, from the customer, for each use of the associated key. The security module may first have to decrypt the associated key via the other key. In at least one embodiment, the security module may be required to generate the associated key from a seed included in the message. As mentioned above, the customer may provide a seed to generate the associated key, rather than providing an encrypted version of the associated key. In at least one embodiment, the provided seed is encrypted, so that the security module must decrypt the seed prior to generating the associated key. The security module provides the decrypted document to the DTS. In preferred embodiments, the associated session key is a symmetric key to decrease the latency of the system.

The DTS may provide the decrypted document to the customer or another customer. However, at no point does the DTS store a non-volatile version of the decrypted data. Accordingly, because the DTS does not have access to the associated key, nor the keys of the customer, the DTS cannot subsequently provide copies of the decrypted document to other parties, once volatile copies of the decrypted document are no longer in persistence. Accordingly, the security of the stored customer documents cannot be breached at the DTS level.

Digital Transaction Service

FIG. 1A is a block diagram of an example embodiment of a digital transaction service. In particular, FIG. 1 depicts a system 100 for facilitating electronic transactions, such as, but not limited to secure electronic signatures and payments between users and/or parties. The DTS 101 may be utilized by or otherwise provide services to one or more parties, such as a first party 110 and a second party 111. At least one of the first party 110 and the second party 111 is a customer of the DTS 101.

In a preferred embodiment, the DTS 101 enables a digital transaction between the first party 110 and the second party 111. For instance, the first party 110 may be an originator or sender of a document and the second party 111 may be a signor of the document. As detailed herein, the DTS 101 may enable or otherwise facilitate the electronic sending and the electronic signing of the document.

In facilitating such digital transactions, the DTS 101 provides various services. Some of these services are included in a service suite 120 of the DTS 101. The services in the service suite 120 may include at least one of, but are otherwise not limited to a web service 122, a messaging service 124, a document creation service 126, a document storage service 128, a document signing service 130, a payment service 132, a discovery service 134, a security service 136, and the like. The DTS 101 may provide some of these services directly to at least one of the first party 110 or the second party 111. However, some of these services may be internal services only. These internal services are provided to other services, some of which may in turn be provided to the first and/or second parties 110/111. These internal services may at least partially facilitate the transactions, but are not directly provided to parties outside of the DTS 101.

As discussed below, the DTS 101 provides a document signing service 130 that forms an association between an electronic signature and an electronic signature document. In an exemplary, but non-limiting digital transaction scenario, the first party 110 operates a first party client device 50 in order to provide (e.g., upload, transmit), via the web service 122, information regarding an electronic document (e.g., an invoice, contract, purchase order, agreement) to the DTS 101. In some embodiments, the first party 110 provides the actual document via the web service 122. In other embodiments, the first party 110 provides an initial or seed document, data, or other information that the document creation service 126 employs to generate and/or modify the electronic document. The first party 110 typically provides additional information to the DTS 101. Such additional information may include the identity or contact information (e.g., email address) of the second party 111, an indication of signature data (e.g., signatures, initials, dates) that are to be collected from the second party 111, and the like. The DTS 101 securely stores the received, created, and/or modified document and the additional information, via a document storage service 128 and a security service 136. For instance, the security service 136 may enable the storage service 128 to store the document in an encrypted format.

The second party 111 then accesses the stored document via the web service 122. Typically, the first party 110 notifies the second party 111 by employing the messaging service 124. The messaging service 124 causes the DTS 101 to send to the second party 111 a message (e.g., an email). The message includes a reference (e.g., a URL) or other indicator that the second party 111 employs to access the document. The DTS 101 retrieves the document from the document storage service 128 and securely provides it (or a representation thereof), via the security service 136 and the web service 122, to the second party client device 51 for presentation. The second party 111 operates a web browser or other client module (e.g., mobile app) executing on the second party client device 51 to access and review the document. When the document 102 has been reviewed to the satisfaction of the second party 111, the second party 111 attaches (or provides an indication or instruction to attach) his electronic signature to the document, via the document signing service 130. Once the signing has been completed, the DTS 101 stores the document 102 in association with electronic signature data and any other evidence of the signing that needs be retained, such as user information, timestamps, and the like.

Once the second party 111 has signed the document, the DTS 101 typically notifies the first party 110, via the messaging service 124 that the document has been signed. For example, the DTS 101 may transmit (e.g., in an email) a URL, link, or other identifier of the document to the first party client device 50. The first party 110 can then use a browser or other client logic executing on the sender client device 50 to access, via the web service 111, the signed document on the DTS 101.

The DTS 101 may perform other or additional functions. For example, the DTS 101 may provide a discovery service 134. As discussed below, the discovery service 134 is an internal service that enables a component or node of the DTS 101 to determine or discovers its functions or roles and also of the functions and roles of other nodes. In at least one embodiment, the discovery service 134 at least partially enables a secure and efficient communication between the nodes.

Digital Transaction Service Architecture

Figure 1B:
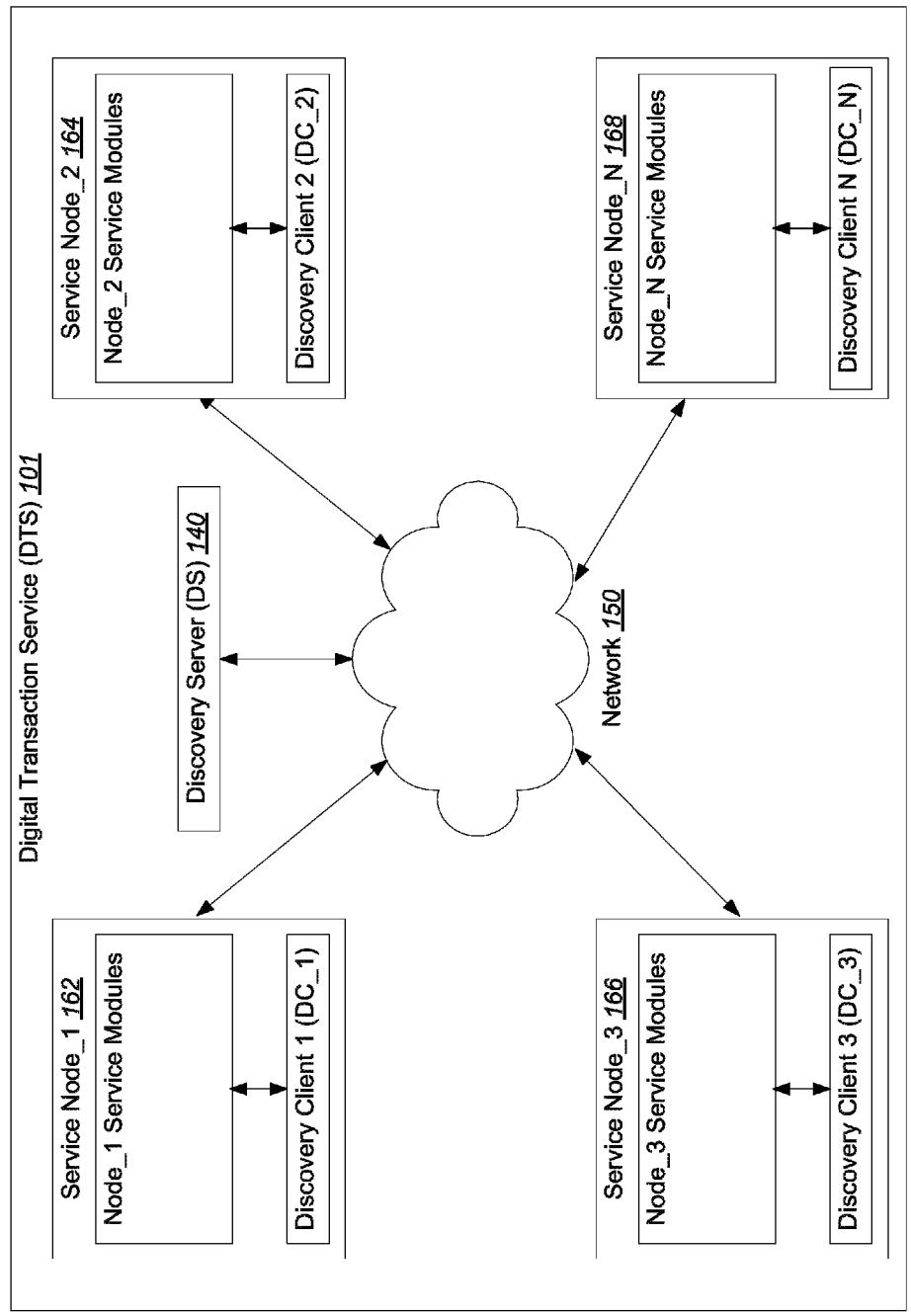
FIG. 1B illustrates one embodiment of an internal architecture of the DTS illustrated in FIG. 1A.

FIG. 1B illustrates one embodiment of an internal architecture of the DTS 101 of system 100 illustrated in FIG. 1A. The DTS 101 includes a cluster of service nodes. In a preferred embodiment, the cluster of service nodes includes N ordered nodes, where N is a positive integer and each of the service nodes is uniquely indexed by a positive integer i, ranging between 1 and N. In the exemplary embodiment shown in FIG. 1B, the DTS 101 includes service node_1 162, service node_2 164, service node_3 166, and service node N 168. The service nodes are communicatively coupled through a network 150. In some embodiments, network 150 may be a private network.

The cluster of service nodes provides services, such as the services included in service suite 120, to nodes, such as the first party client device 50 and the second party client device 51. Furthermore, at least some of the services may be internal services and provided to at least one of the internal service nodes. To enable the provided services, at least one of the service nodes includes one or more service modules.

The Discovery System

To provide services to clients or nodes, it must be determined which nodes in the service node cluster provide which services to which clients, nodes, or modules. In a preferred embodiment, the DTS 101 includes a discovery system, sub-system, or infrastructure that at least partially enables this determination. The discovery system includes a discovery server (DS) 140. At least one of the service nodes includes a discovery client (DC). A node that includes a discovery client may be referred to as a "discovery node." Accordingly, a single node may be both a service node and a discovery node. The DS server 140 provides a discovery manifest to at least one of the discovery clients included in the service nodes in the service cluster. In at least one embodiment, the discovery system is based on a lookup configuration, such as, but not limited to a relational database. In such embodiments, the discovery system may employ Structured Query Language (SQL) to discover or otherwise lookup public keys of the nodes. For instance, a first node may be enabled to lookup a public key of another node via an execution of a SQL instruction. As described below, other embodiments of a discovery system include more complex lookup or discovery features or actions.

FIG. 2A is a block diagram of an example embodiment of a discovery manifest 200. The discovery manifest 200 is a set of data that enables a determination of the various roles of one or more of the nodes within a cluster. The discovery manifest 200 data set may be structured data or unstructured data. The discovery manifest includes a first time stamp that is associated with the time when the discovery manifest 200 was published by the DS 140. The discovery manifest 200 may include at least two other ordered time stamps that indicate the beginning and the end of the time window when the information included in the discovery manifest 200 is valid. The discovery manifest also includes the number of service nodes, N, that are included in the service node cluster.

The discovery manifest 200 includes information specific to each of the service nodes. The node specific information may be arranged in a data structure such as a table, list, multi-dimensional array, data object, or the like. FIG. 2A shows one exemplary embodiment of such a table. For each node, the table may include a node number, the unique identifier (ID) and/or address, the role of the node, and an access control list (ACL) for the node. The node role indicates what service or service modules that the particular node is responsible to run or perform. Accordingly, each node that is provided a copy of the discovery manifest 200 may "discover" its role in providing services to other internal nodes or other nodes that are external to the service cluster.

A key pair that includes a private key and a public key is associated with each service node in the cluster. Accordingly, the public and the private keys for the ith node may be referenced as PuK(i) and PrK(i), respectively. The table included in the discovery manifest 200 includes the public key for each of the nodes. Thus, each node provided a copy of the discovery manifest 200 is provided access to each of the other node's public keys. In a preferred embodiment, the ith node is not provided access to the jth node's private key, where $i,j=1, 2, \ldots N$ and $i \neq j$.

Each node may generate the key pair associated with the node. In other embodiments, and as discussed further below, the key pairs may be generated by another node, such as a key manager. In preferred embodiments, each node is provided access to its own private key but is not provided access to the private key associated with the other nodes. However, the discovery manifest 200 provides each node access to the public keys of the other nodes.

A key pair is associated with the DS 140: PuK(DS) and PrK(DS). Each of the service nodes are provided access to PuK(DS) through communication channels other than the discovery manifest 200. In a preferred embodiment, the discovery manifest 200 includes a digital signature signed using the PrK(DS). In a preferred embodiment, the DS 140 signs the discovery manifest 200 with the PrK(DS). Accordingly, each service node with access to PuK(DS) can verify the authenticity and integrity of the discovery manifest 200.

FIG. 2B is a block diagram of a storage portion of the ith discovery client (DC_i) included in the ith service node of the service cluster. Each of the discovery clients stores various data and/or information. The DC_i stores a private key associated with the ith discovery client (PrK(i)), as well as the public key associated with the discovery server 140 (PuK(DS)). The private key associated with DC_i may be the private key associated with the node that includes DC_i. Furthermore, DC_i stores information particular to the other nodes. Such particular information may be provided by the discovery manifest 200 of FIG. 2A. At least a portion of this information may be stored in a data table, or any other appropriate data structure. For the jth node (DC_j), DC_i may store the client's ID/Address (ID(DC_j)), the client's roles (ROLE(DC_j)), the client's ACL (ACLS(j)), and the client's public key (PuK(j)). As discussed further below, DC_i may additionally store or cache other information particular to the other nodes. For instance, DC_i may cache a symmetric key associated with both DC_i and DC_j (SK(DC_i, DC_j)).

Secure Communication Between Each of the Nodes

Figure 3:
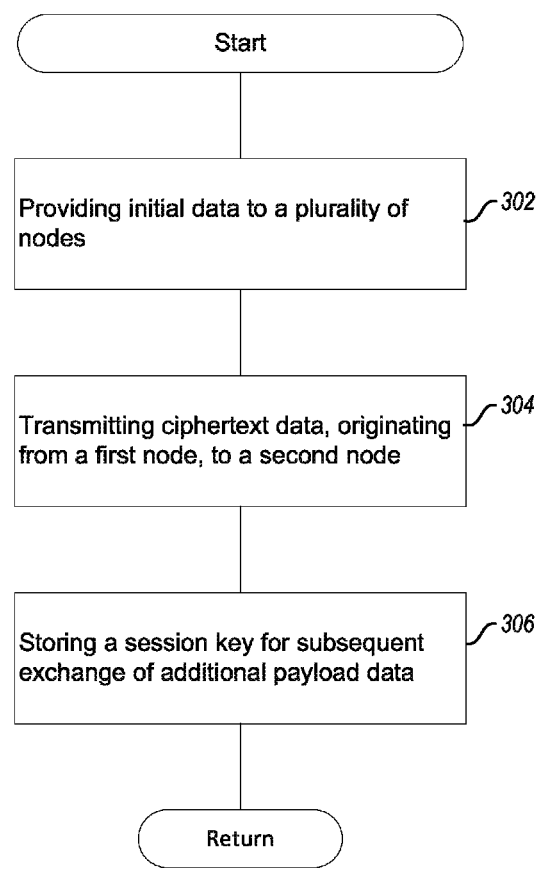
FIG. 3 is a flow diagram illustrating security operations performed by an example DTS.

FIG. 3 is a flow diagram illustrating security operations performed by an example DTS. The process enables the efficient and secure exchange of information or data between nodes of a data transmission system or network. The security operations shown in FIG. 3 enable a secure and persistent data exchange session between a first node and a second node.

The process begins at block 302, where initial data is provided to a plurality of nodes within the network. By providing the nodes the initial data, any servers, clients, or modules included on the nodes may also be provided the initial information. In a preferred embodiment, the initial data includes at least a plurality of public keys. At least some of the public keys in the initial data are uniquely associated with the nodes in the network. Accordingly, each of the nodes that is provided the initial data is provided access to each of the public keys that are uniquely associated with at least a portion of other nodes in the network. The nodes provided the initial data may be internal nodes, external nodes, or a combination thereof.

In various embodiments, the initial data includes discovery data. The initial data may include a discovery manifest, such as discovery manifest 200 of FIG. 2A. In at least one embodiment, a copy of the discovery manifest is provided to each discovery node in the DTS 100. The discovery manifest 200 may be provided by a discovery server, such as discovery server 140 of FIG. 1B. As shown in FIG. 2B, the discovery clients, or the discovery nodes may store or cache at least a portion of the initial information, such as the public leys associated with other nodes or clients.

In various embodiments, the initial data includes a digital signature associated with the provider of the initial data. For instance, when the DS 140 provides a discovery manifest, each node that is provided a discovery manifest may verify at least one of an authenticity or an integrity of the provided discovery manifest. In the event that at least one of, or both of, the authenticity or the integrity of the discovery manifest cannot be verified, the discovery clients may veto and/or discard the data included in the discovery manifest.

In block 304, ciphertext data is provided to a second node in the network. The ciphertext data may be provided to the second node in a message that enables proactive authorization using payload cryptography. At least a portion of the ciphertext data is associated with payload and/or message data. When the portion of the ciphertext that is associated with the payload data is decrypted with the appropriate decryption key, the resulting plaintext includes the payload data. At least a portion of the payload data originates at the first node. Another portion of the provided ciphertext data is associated with a symmetric key. When the portion of the ciphertext that is associated with the symmetric key is decrypted with the appropriate decryption key, the resulting plaintext includes the symmetric key. The symmetric key is associated with both the first and the second nodes. Both the ciphertext data associated with the payload data and the ciphertext data associated with the symmetric key may be transmitted to the second node in a single, initial message.

The ciphertext associated with the payload data and provided to the second node is encrypted with the symmetric key. Accordingly, the symmetric key may be employed to decrypt and generate the plaintext corresponding to the payload data. The ciphertext associated with the symmetric key and provided to the second node is encrypted with the public key associated with the second node. Thus, the second node's private key may be employed to decrypt and generate the plaintext of the symmetric key. In at least one embodiment, the single message that includes both the payload data (encrypted with the symmetric key) and the symmetric key (encrypted with the second node's public key) includes a digital signature, signed by employing at least the private key of the first node.

The initial single message may be formatted or structured in any appropriate manner. The single message may include indications, metadata, or function arguments such as data cryptography type, asymmetric type, session key guide, length of the session key, the cipher, and the like. In a similar fashion, the signature included in the single message may include information, function arguments, or metadata associated with the signature. The message may be provided by employing either a push or a pull operation. Any appropriate networking protocol may be employed when transmitting the initial or any subsequent messages.

The second node may perform the decryption of the symmetric key. Likewise, the second node may perform the decryption of the payload data. In other embodiments, at least one of these decryption processes may be performed by another node, such as a node that includes a security module or a key manager.

In block 306, the symmetric key is stored or cached. In preferred embodiments, the plaintext of the symmetric key is stored by at least one of the first and the second nodes. When both the first and the second nodes store the plaintext of the symmetric key associated with the first and second nodes, the first and second nodes can securely and efficiently exchange additional payload data using the symmetric key. In at least one embodiment, the symmetric key is stored by a security module and/or a key manager.

Security Module

As noted throughout, for at least some embodiments, a cryptographic workhouse, or security module, provides at least some of the cryptographic services required to establish and maintain the secure exchange of data between the internal and the external nodes. In some embodiments, the cryptographic workhorse is internal to the DTS. In other embodiments, the workhorse is external to the DTS. A trusted third party, such as a governmental agency, may control an external cryptographic workhorse. In various embodiments, trust is determined by the discovery client based on the discovery manifest. A discovery client may determine a level of trust for each public key that is included in the discovery manifest. Accordingly, each node may determine trust based on the public keys included in a manifest. Specifically, a node may be trusted based on the public keys that the corresponding discovery client trusts.

The security module may be localized to a single node or distributed amongst a plurality of nodes. The security module includes a key manager that is internal to the DTS. In these embodiments, the internal key manager is enabled to generate both symmetric keys and asymmetric key pairs. At least a portion of the generated keys are stored by the key manager. Other nodes may not be provided access to at least some of the keys stored by the key manager, such as private keys or session keys. In other words, private keys generated by the key manager never leave the key manager. Other keys generated by the key manager, such as public keys or sessions keys may be provided to other nodes, but in an encrypted format. Accordingly, the internal key manager actively safeguards, secures, and/or protects the cryptographic keys.

In some embodiments, an internal node or module receives a key from an external node. For instance, an external key manager may provide the discovery server or the security module an initial message associated with establishing a secure information exchange between an internal and an external node. The initial message includes at least an asymmetrically encrypted session key. The initial message may also include payload data that is symmetrically encrypted with the session key. If provided to the discovery server, the discovery server provides the initial message to the security module. The security module provides the cryptographic services and stores the session key in the internal key manager for subsequent data exchanges between the internal and the external node.

In at least one embodiment, in order to provide additional security and efficiency, the discovery manifest is signed by employing a key associated with the security module. The security module or cryptographic workhorse provides the signature services. The security module's signature key may be daisy chained to a trusted third party, such as a certificate authority. In other embodiments, the security module's signature may be issued directly by a certificate authority or governmental agency.

In some embodiments, each of the internal private keys are stored on the internal key manager. In such embodiments, the key manager does not provide access of the private keys to any other node. Accordingly, the private keys cannot be accessed by any other internal or external node, module, or machine. In various embodiments, the security module is enabled to carry out various security-related services or functions. These functions include, but are not limited to the generation of symmetric keys and asymmetric key pairs, providing public keys, deleting or removing keys from storage or cache, generating encrypted data based on the stored keys, providing decrypted data based on the stored keys, signing data and/or messages, and securing and safeguarding key storage.

An external party may provide encryption keys directly to the security module, such as by "side loading" keys. The provided keys may be in an encrypted format. Prior to storing these keys, the key manger may decrypt the provided keys. In other embodiments, the key manger stores the keys in an encrypted format. Because the key manager actively secures the keys, in at least some embodiments, external parties may provide private keys to be safeguarded and stored by the key manager. The modular architecture of the security module enables the decoupling of the discovery service, as well as other services provided by the DTS, from the security service. In at least one embodiment, the security module is provided by a third party, trusted by both the DTS and its customers, such as an independent security provider, certificate authority, or governmental agency.

Figure 4:
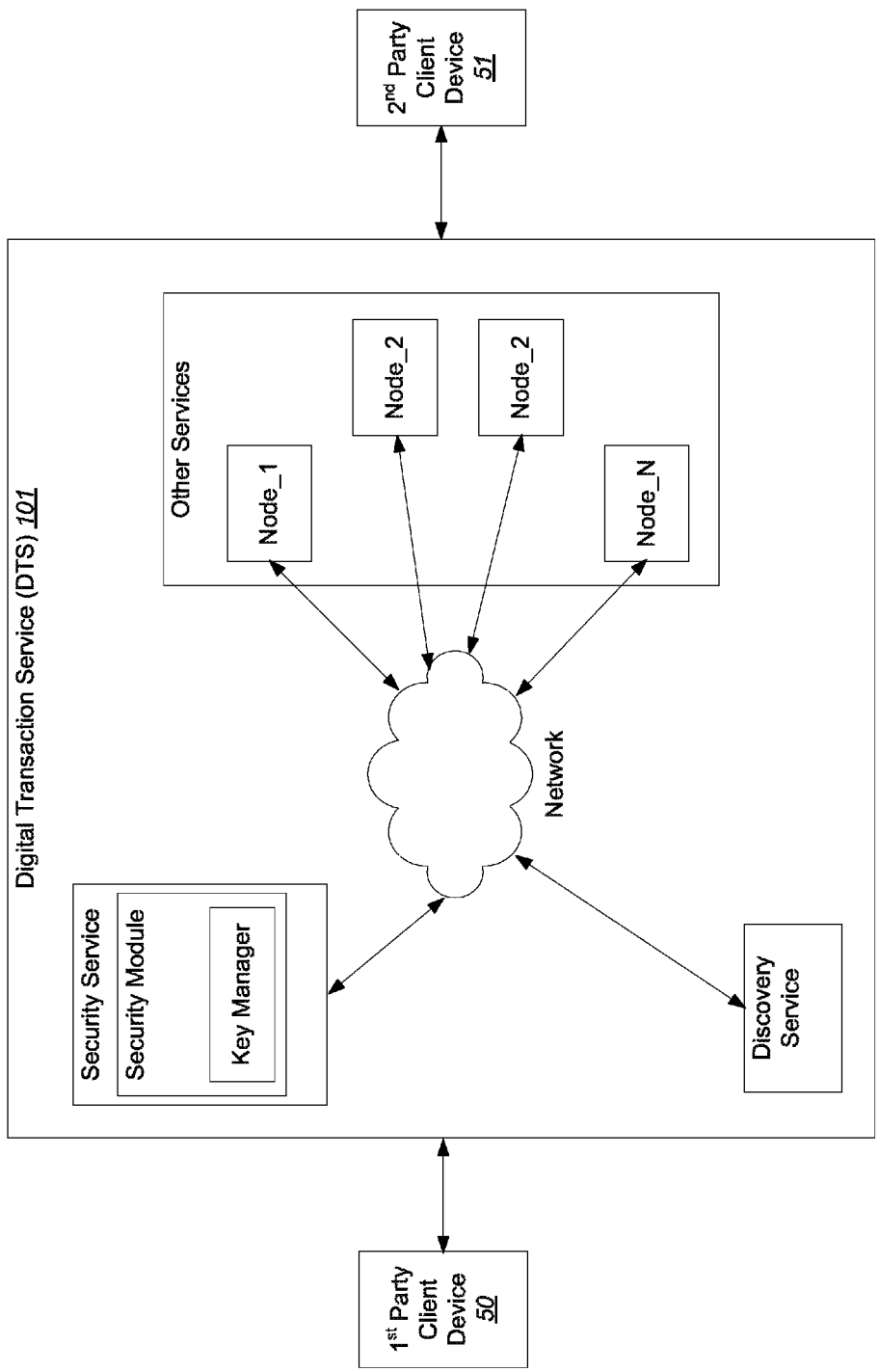
FIG. 4 is a block diagram of an example embodiment of a DTS that includes a security service that is distinct from other services provided by the DTS.

FIG. 4 is a block diagram of an example embodiment of a DTS 101 that includes a security service that is distinct from other services provided by the DTS 101, such as the discovery service. The security service includes a security module. The security module includes an internal key manager. Although distinct, the security service is communicatively coupled to the other services provided by the DTS via the private network internal to the DTS 101.

The security module provides various security services including, but not limited to symmetric/asymmetric key generation, receiving keys from external and internal nodes, storing and safeguarding keys, providing public keys, deleting or removing expired keys, symmetrically/asymmetrically encrypting data that is provided to the security module, providing decrypted data, signing or certifying messages, and the like.

Figure 5A:
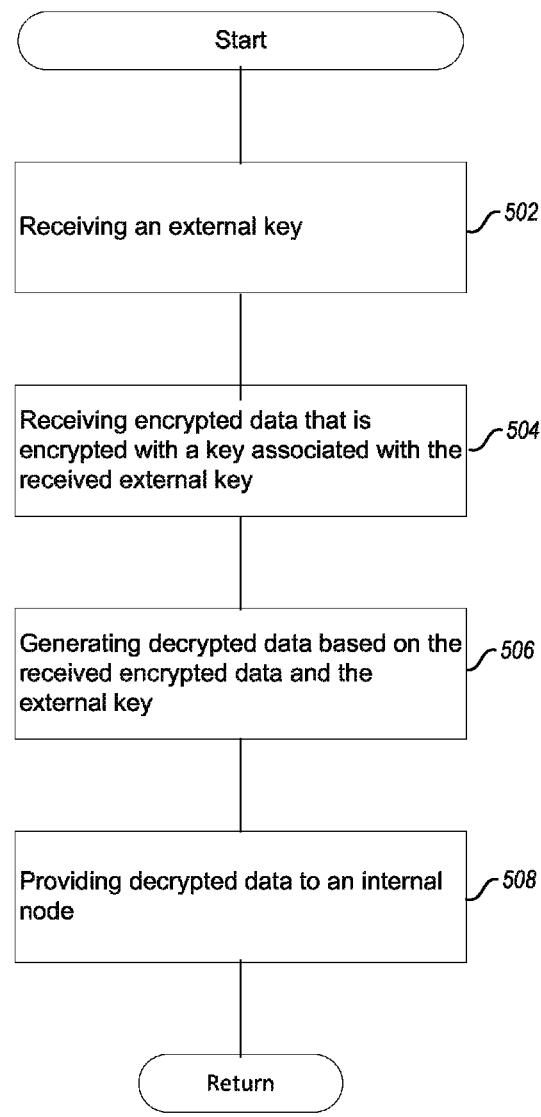
FIGS. 5A-5B provide flow diagrams illustrating operations performed by an example security module.

FIG. 5A is a flow diagram illustrating operations performed by an example security module. The operations shown in FIG. 5A enable the secure communication between an external and an internal node. Similar operations may be performed to enable the secure communication between internal nodes.

The process begins at block 502, where an external key is received by the security module. For instance, the key may be a public key associated with an external node. The key may be stored and safeguarded by a key manager included in the security module. In various embodiments, another party, such as a customer of the DTS, may provide the external key. The customer may side load the key into the security module. In various embodiments, the external key is provided through a user account.

Figure 6:
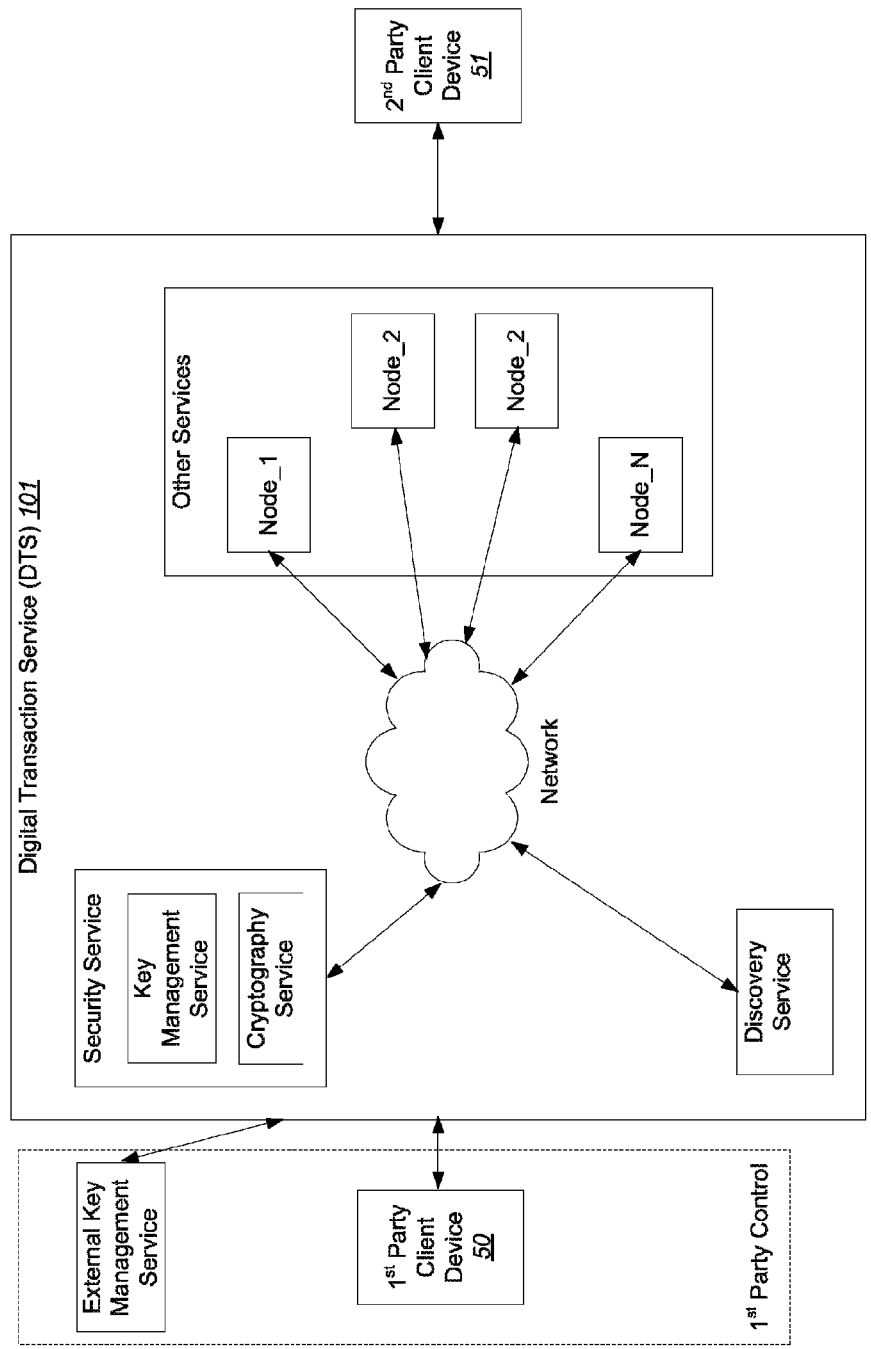
FIG. 6 shows an external key management service that is controlled by a first party external to the DTS.
Figure 7:
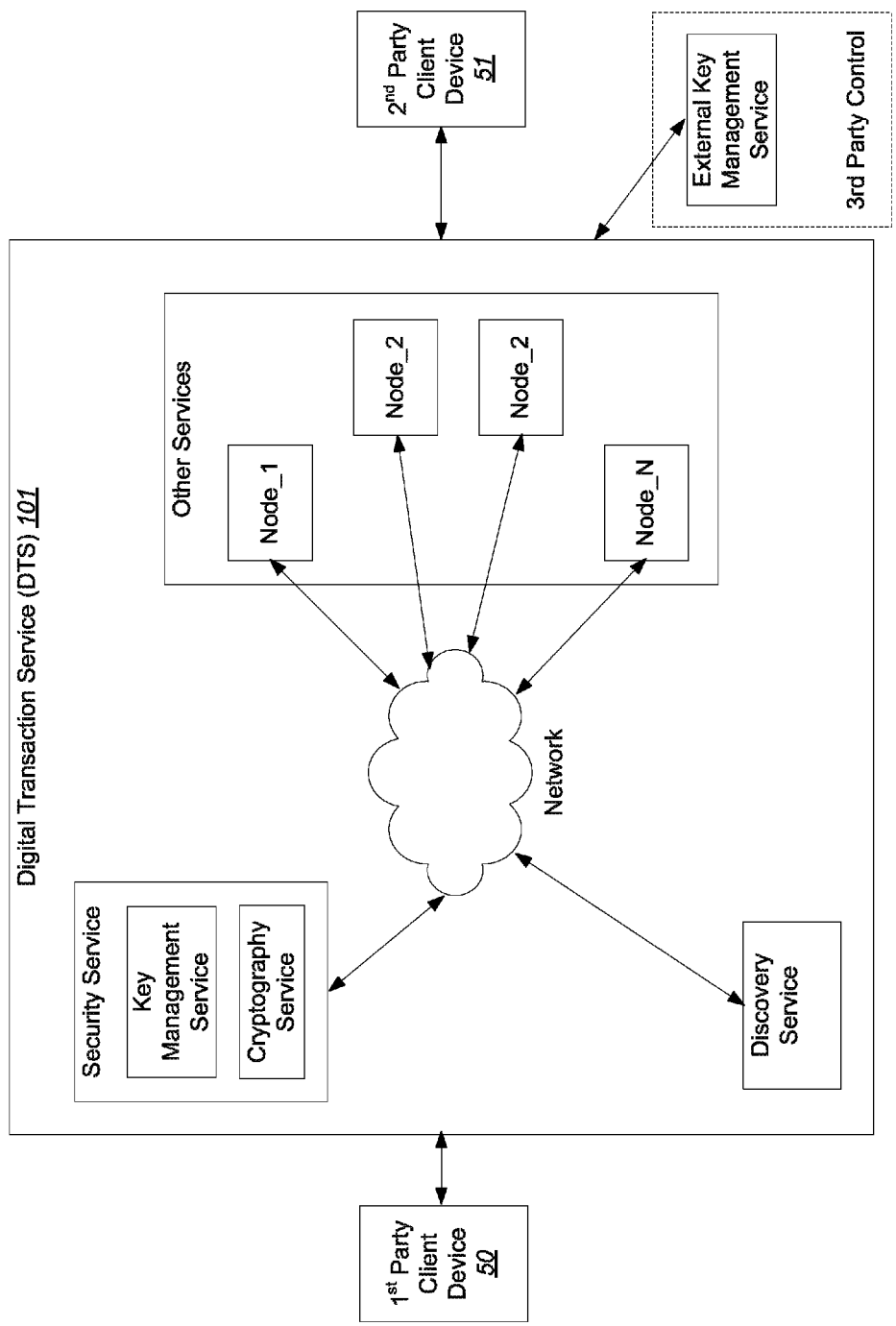
FIG. 7 shows an external key management service that is controlled by a third party external to the DTS.

In at least one embodiment, the received key is provided by an external key manager. For instance, FIG. 6 shows an external key management service that is controlled by a first party external to the DTS 101. The external key management service is enabled to provide external keys to the security service module over a public network. In the embodiment shown in FIG. 6, the security service includes a key management service that is distinct from the cryptographic service. The external key manager may be controlled by a third party. FIG. 7 shows an external key management service that is controlled by a third party external to the DTS 101. The third party may be a party trusted by the both the DTS 101 and the DTS customers, such as a governmental agency or certificate authority.

In at least one embodiment, the external key is provided in an encrypted format. In such an embodiment, the cryptographic service may decrypt the received key by employing a previously received and/or generated key. The key management service stores or caches the decrypted key. The received key may be a session key associated with a communication session between an external node and an internal node. In some embodiments, the received key is a symmetric session key. In at least one embodiment, rather than receiving an external key at block 502, the security module generates the key.

At block 504, the security module receives encrypted data that is encrypted with a key associated with the received external key. In various embodiments, the received data is asymmetrically encrypted with a key that is a private key paired with the received public key. In other embodiments, the received data is symmetrically encrypted with the session key received in block 502. The encrypted data may be provided by a node that is external to the DTS, such as the first party client device 50 of FIG. 6.

At block 506, the security module generates decrypted data based on the received encrypted data and the external key. The decrypted data may be generated by symmetrically or asymmetrically decrypting the received encrypted data with the received public key. At block 508, the decrypted data is provided to an internal node. Accordingly, the security module enables a secure session between an external node and an internal node, while eliminating inefficient handshakes with other authenticating nodes.

Figure 5B:
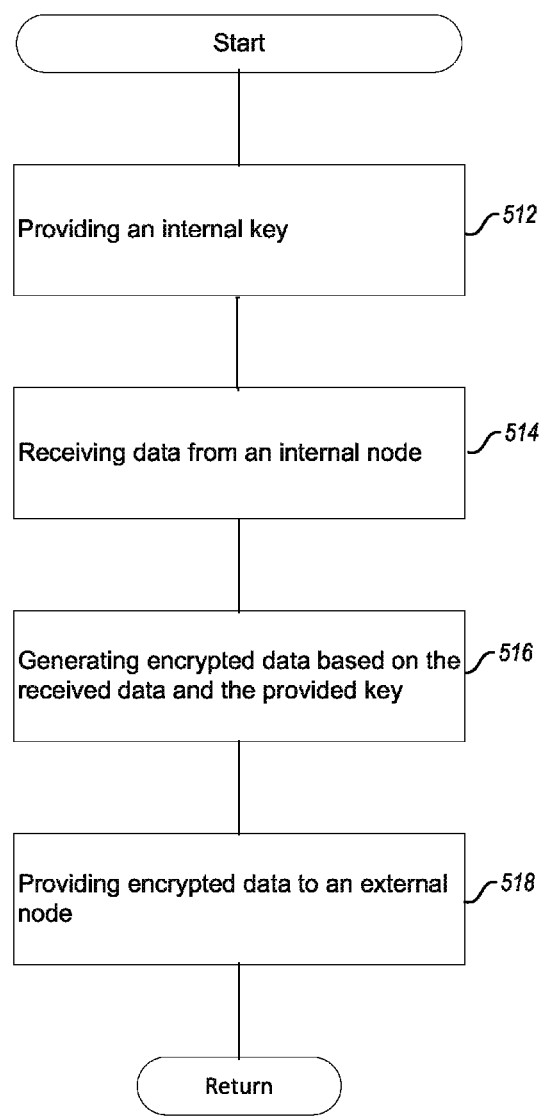

FIG. 5B is a flow diagram illustrating operations performed by another example security module. The operations shown in FIG. 5B enable the secure communication between an external and an internal node. Similar operations may be performed to enable the secure communication between internal nodes.

The process begins at block 512, where an internal key is provided to the cryptographic module. The internal key may be a public key associated with an internal node. In other embodiments, the provided key may be a symmetric session key associated with a secure session between an internal node and an external node. The public key may be provided to an external node, such as an external key manager. The key may be provided in an encrypted format. When providing the key, the security module may provide a digital signature or certification associated with the key. The key manager may generate the provided key.

At block 514, the security module receives data from an internal node. At block 515, encrypted data is generated based on the received data and the provided key. For instance, the received data may be asymmetrically encrypted using the private key associated with the public provided to an external node in block 512. In other embodiments, the data is encrypted by employing the symmetric key provided in block 512. In block 518, the encrypted data is provided to an external node.

Example Implementation

Figure 8:
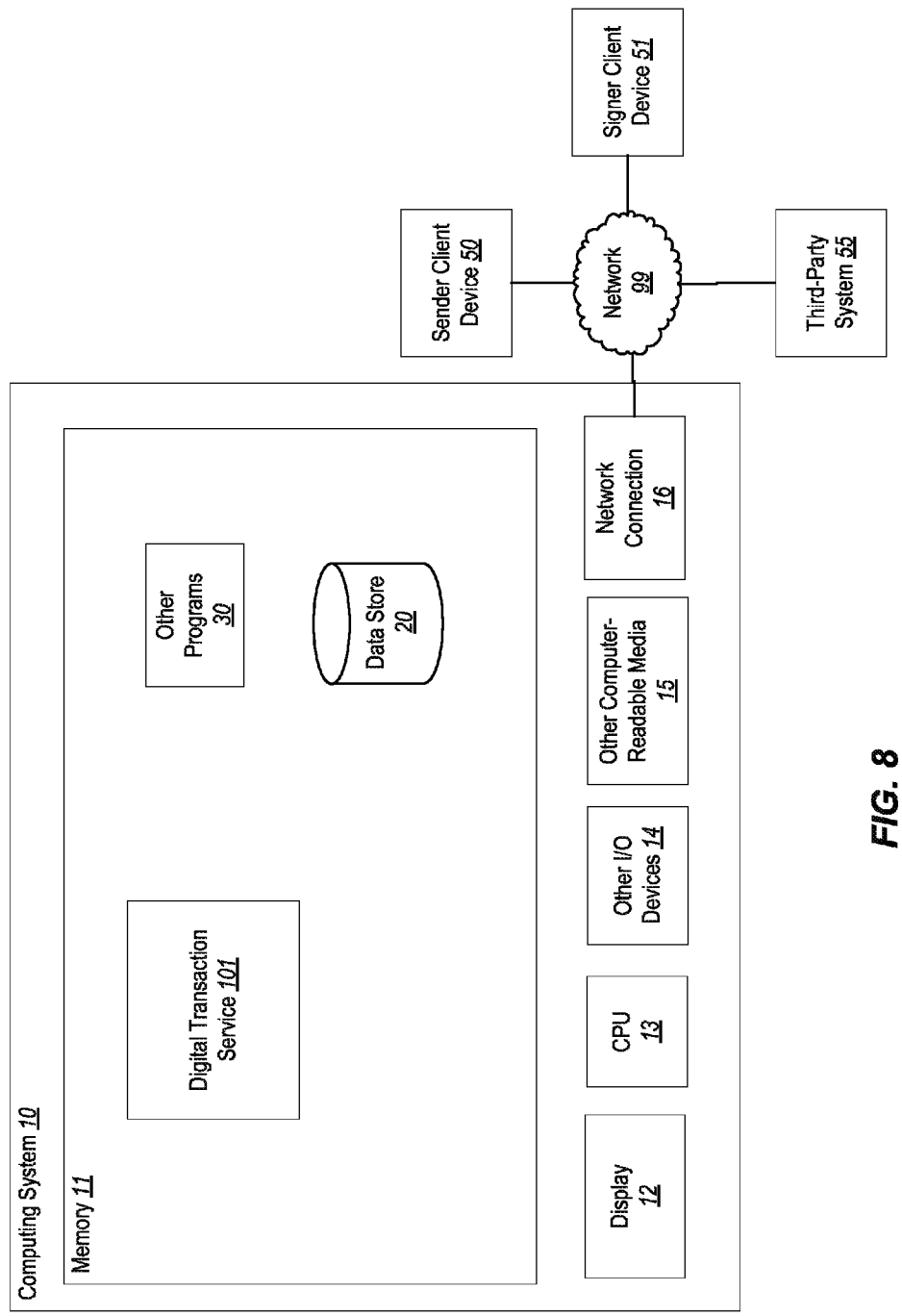
FIG. 8 is a block diagram of an example computing system for implementing example embodiments of the security service provider.

FIG. 8 is a block diagram of an example computing system for implementing example embodiments of the security service provider. In particular, FIG. 8 shows a computing system 10 that may be utilized to implement a DTS, such as DTS 101 of FIG. 1A. Also, the techniques described with respect to FIG. 8 may be applied to implement other computerized elements discussed herein, such as the first party client device 50 and the second party client device 51 of FIG. 1A and FIG. 8.

Note that one or more general purpose or special purpose computing systems/devices may be used to implement the DTS 101. In addition, the computing system 10 may comprise one or more distinct computing systems/devices and may span distributed locations. Furthermore, each block shown may represent one or more such blocks as appropriate to a specific embodiment or may be combined with other blocks. Also, the DTS 101 may be implemented in software, hardware, firmware, or in some combination to achieve the capabilities described herein.

In the embodiment shown, computing system 10 comprises a computer memory ("memory") 11, a display 12, one or more Central Processing Units ("CPU") 10, Input/Output devices 14 (e.g., keyboard, mouse, CRT or LCD display, and the like), other transitory and non-transitory computer-readable media 15, and network connections 16 connected to a network 99. The DTS 101 is shown residing in memory 11. In other embodiments, some or all of the components of the DTS 101 may be stored on and/or transmitted over the other computer-readable media 105. The components of the DTS 101 preferably execute on one or more CPUs 13 and provide security services as described herein. Other code or programs 30 (e.g., an administrative interface, a Web server, and the like) and potentially other data repositories, such as data repository 12, also reside in the memory 11, and preferably execute on one or more CPUs 13. Of note, one or more of the components in FIG. 8 may not be present in any specific implementation. For example, some embodiments may not provide other computer readable media 15 or a display 12.

The data store 20 is used by the other modules of the DTS 101 to store and/or communicate information. The components of the DTS 101 use the data store 20 to record various types of information, including secure data, encryption keys, manifests, policy information, and the like. The data store 20 may implement the document store and/or key store described throughout.

The DTS 101 interacts via the network 99 with client devices. The network 99 may be any combination of one or more media (e.g., twisted pair, coaxial, fiber optic, radio frequency), hardware (e.g., routers, switches, repeaters, transceivers), and one or more protocols (e.g., TCP/IP, UDP, Ethernet, Wi-Fi, WiMAX) that facilitate communication between remotely situated humans and/or devices. In some embodiments, the network 99 may be or include multiple distinct communication channels or mechanisms (e.g., cable-based and wireless). The client devices include personal computers, laptop computers, smart phones, personal digital assistants, tablet computers, and the like.

In an example embodiment, components/modules of the DTS 101 are implemented using standard programming techniques. For example, the DTS 101 may be implemented as a "native" executable running on the CPU 13, along with one or more static or dynamic libraries. In other embodiments, the DTS 101 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the DTS 101, such as in the data store 20, can be available by standard mechanisms such as through C, C++, C#, and Java APIs; libraries for accessing files, databases, or other data repositories; through scripting languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the DTS 101 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above-cited references are incorporated herein by reference in their entirety. Where a definition or use of a term in an incorporated reference is inconsistent or contrary to the definition of that term provided herein, the definition of that term provided herein governs and the definition of that term in the reference does not apply.

While the preferred embodiment of the invention has been illustrated and described, as noted above, many changes can be made without departing from the spirit and scope of the invention. Accordingly, the scope of the invention is not limited by the disclosure of the preferred embodiment.

Definitions

As used herein, the term "node" refers to any connection point within a data transmission system or network. The node may be either a redistribution node or an endpoint node within the data transmission system. A node may be a physical machine, a virtual machine (VM), or a combination thereof. A node may include a computing device or a set of computing devices (a computing system). A plurality of nodes may be included in a single physical machine or a single VM. Furthermore, a single node may be distributed among a plurality of physical machines or VMs.

A node is commutatively coupled to at least one other node via the data transmission system or network. A "cluster" is a set of nodes, wherein each node in the cluster is enabled to provide data to at least one other node in the cluster, either through a direct transmission to the other node or indirectly through a transmission to another connection point in the data transmission system. In various embodiments, each node in a cluster includes a unique identifier (ID), such as an internet protocol (IP) address, media access control (MAC) address, or the like. A node may be an "internal node," if it is at least partially controlled by a first party. A node is an "external" node if it is at least partially controlled by another party.

As used herein, a "module" is a discreet physical or virtual component enabled to perform at least one specific and well-defined function, task, sub-task, method, subroutine, step, process, or the like. A module may be a software module, a hardware module, or a combination thereof. A plurality of modules may be linked, or otherwise associated as a set to perform a task, process, or method. For instance, a service may be provided to a node by employing a set of service modules, wherein when arranged as a group or set of modules, the set is enabled to perform each of the functions or tasks associated with the service. The modules within a set may be arranged in a serial configuration, a parallel configuration, or any combination thereof.

A module within the set may be communicatively coupled to at least one other module in the set and provide data to the at least one other module. A module may receive input as well as provide output. For instance, a module may provide feedback, the results of an intermediary task, or other such information to other modules within the set. The modules may be implemented in the node that is provided the service or at least partially implemented in other nodes of the data transmission system. A single module may be implemented in a single node or distributed across a plurality of nodes. Likewise, a set of modules associated with a particular service may be implemented in a single node or distributed across a plurality of nodes.

As used herein, a "client" refers to any node, software and/or hardware application, device, system, sub-system, module, component, assembly, or party that requests a service to be provided. A "server" refers to any node, software and/or hardware application, device, system, sub-system, module, component, assembly, or party that at least partially provides the requested service.

As used herein, the term "encryption" refers to any process, method, function, subroutine, or algorithm that transforms or otherwise maps information or a dataset from a first state to a second state. The first state of information or data may be referred to as "plaintext" or "decrypted" data, while the second state of the information may be referred to as "ciphertext" or "encrypted" data. In a preferred embodiment, the plaintext is non-random and useful data. The ciphertext provides the appearance of pseudo-randomized data. The entropy of ciphertext may be greater than the entropy of the associated plaintext. Accordingly, to utilize or employ the information or dataset, the plaintext state must be available.

The encryption process generates and/or determined the ciphertext based on the plaintext and an "encryption key." The encryption key is another set of information that when combined with the plaintext, enables the encryption process to deterministically provide or generate the ciphertext. Accordingly, the encryption process provides the appearance of generating pseudo-random data (ciphertext) based on non-random input data (plaintext) and the encryption key.

In a preferred embodiment, the encryption process is an invertible process or cipher. "Decryption" refers to any process, method, function, subroutine, or algorithm that transforms or maps the information or data from the second state (ciphertext) to the first state (plaintext). The decryption process generates and/or determined the plaintext based on the ciphertext and a "decryption key." Accordingly, the decryption process provides the appearance of generating non-random data (plaintext) based on pseudo-random input data (ciphertext). The encryption and decryption processes may be inverse functions to one another. However, in a preferred embodiment, decryption is computationally infeasible, or at least extremely difficult, in the absence of the information included in the decryption key. Accordingly, the ciphertext provides little to no utility to a party that is not provided the decryption key.

As used herein, the term "symmetric" encryption/decryption refers to when the encryption and decryption keys are identical keys, or at least when it is computationally feasible to determine the decryption key based on the encryption key, and vice-versa. "Asymmetric" encryption/decryption refers to when the encryption and decryption keys are not equivalent and it is computationally infeasible to determine one of the keys based on knowledge of the other key.

Regarding asymmetric encryption/decryption, a "key pair" is a set of keys that includes both the encryption key and the decryption key. The keys are generated as a pair and are mathematically linked, typically by at least one value, such as a pseudo-random number or seed. Although linked by the at least one seed, without knowledge of the seed, determining one of the keys from the other keys is computationally infeasible. In preferred embodiments, when generating a key pair, the size of the set of possible seeds is computationally significant. In at least one preferred embodiment, the key pair is dependent upon a plurality of seeds.

One of the keys in the key pair may be labeled as a "public key" (PuK) and the other key is labeled as a "private key" (PrK). Access to the private key may be more restrictive than access to the public key. For instance, for a given key pair, a greater number of nodes, modules, clients, servers, devices, machines, parties and the like may have access to the public key than the number of nodes, modules, clients, servers, devices, machines, parties and the like that have access to the private key. In some embodiments, only a single node, module, client, server, device, machine, party, or the like has access to the private of a particular key pair, while a plurality of nodes are provided access to the corresponding public key.

In at least some embodiments, either of the keys in an asymmetric key pair may serve as the encryption key and the other key functions as the decryption key. For instance, an encryption process may be functionally represented as: "E(plaintext, encryption_key)=ciphertext" and the inverse decryption process as: "D(ciphertext, decryption_key)=plaintext," where E and D represent inverse ciphers. For a given key pair (PuK, PrK), encryption employing PuK may generate a first ciphertext, i.e., E(plaintext, PuK)=ciphertext_1. Decrypting the first ciphertext with PrK generates the original plaintext: D(ciphertext_1, PrK)=plaintext.

In at least some embodiments, the roles of the key may be reversed to generate a second ciphertext from the plaintext: E(plaintext, PrK)=ciphertext_2 and D(ciphertext_2, PuK)=plaintext. Note that in at least some embodiments, the generated ciphertext (ciphertext_1 and ciphertecxt_2) depends upon which of the keys of the key pair is chosen as the encryption key (PuK or PrK), and ciphertext_1 is not equivalent to ciphertext_2. However, both ciphertext_1 and ciphertext_2 are associated with relatively high entropy and provide the appearance of pseudo-random data.

Accordingly, any party that has access to an encryption algorithm and the encryption key, such as PuK, may generate ciphertext or encrypted data based on original information. Because the ciphertext appears as pseudo-random data, the ciphertext adequately secures or obfuscates the original information or plaintext. Only those parties that have access to both the decryption algorithm or cipher and the corresponding decryption key (PrK) may decrypt the encrypted data and determine the original plaintext.

As used herein, the term "hash function" refers to a function that deterministically maps input data to output data. Unlike the encryption and decryption functions, in preferred embodiments, a hash function is a non-invertible function or at least a function that is not invertible by computationally feasible means. For instance, a hash function may not be a one-to-one function. Furthermore, in preferred embodiments, a small perturbation in the input data results in a significant difference in the output data. The size of the output data of a particular hash function may be a standard output size (e.g., 256 bits). The standardized size of the output data may be insensitive to the size of the input data. In at least one embodiment, the standardized size of the output data is less than the size of typical input data. The output data of a hash function is referred to as "the hash" of the input data.

As used herein, the term "digital signature" refers to any data that is associated with other data and provides a means to determine a sender, provider, or originator of the associated or other data. The other data may be referred to as "message data" or "payload data." Note that the terms message data and payload data may be used throughout the present disclosure in contexts that are separate from the context of a digital signature.

The digital signature data may be included as metadata associated with the message data or may be appended, embedded, or concatenated onto the message data. The digital signature data may include a hash of the message data. In a preferred embodiment, the hash of the message data is asymmetrically encrypted using one of the keys of a particular key pair, such as a private key associated with the signatory. If a party is provided the message data and the hash function, the party may determine the hash of the message data by employing the hash function.

Furthermore, if the party is provided the digital signature data and access to the other key in the particular key pair, i.e., the public key, the party may separately and independently determine the hash of the message data by decrypting the digital signature data with the public key.

If and only if the two methods of determining the hash of the message data generate equivalent hashes, the party has reason to believe that another party that had access to the particular private key encrypted the digital signature data. Additionally, if and only if the two methods of determining the hash of the message data generate equivalent hashes, the party has reason to believe that the message data has not been altered and/or perturbed after the digital signature data has been associated with the message data. Accordingly, a digital signature provides a means for a party that is provided message data to authenticate the provider or sender of the message data and to verify the integrity of the received message data.

The embodiments of the invention in which an exclusive property or privilege is claimed are defined as follows:

1. A method for providing security services that are associated with an online service, the online service includes a digital transaction service that is at least partially provided by a computing cluster that includes a first node, the method comprising employing a security module that is distinct from the computing cluster to:

generate a session key, wherein the session key is a symmetric session key;

associate the session key with the first node and a second node;

receive payload data originating from the first node;

symmetrically encrypt the received payload data based on the session key; and provide a first message to the second node, wherein the first message includes the encrypted payload data.

2. The method system of claim 1, the method further comprising employing the security module to:

receive a second key that is associated with the second node;

encrypt the session key based on the received second key that is associated with the second node; and provide the encrypted session key to a key manager that is associated with the second node.

3. The method of claim 1, wherein the first message is transmitted by the second node to the first node, and subsequently the first node transmits the first message to the security module.

4. The method of claim 1, wherein the method further comprises employing the security module to:

receive additional payload data originating from the second node, wherein the received additional payload data is symmetrically encrypted;

symmetrically decrypting the additional payload data based on the session key; and provide a second message to the first node, wherein the second message includes the decrypted additional payload data.

5. The method of claim 1, the method further comprising employing a key manager included in the security module to:

store the session key;

actively safeguard the stored session key; and in response to a request from the online service, delete the stored key.

6. A non-transitory computer-readable medium including instructions that, when executed by a computing system having a computing cluster, perform a method that enables a security module that is distinct from the computing cluster to provide security services to a plurality of nodes that are distinct from the computing system executing the instructions, wherein the plurality of nodes includes a first node that is included in a digital transaction service, the method comprising:

generating a session key;

associating the session key with a secure data exchange session between the first node and a second node;

receiving payload data originating from the first node;

encrypting the received payload data based on the session key; and providing a first message to the second node, wherein the first message includes the encrypted payload data.

7. The computer-readable medium of claim 6, the method further comprising:

encrypting the session key based on a key associated with the second node; and providing the encrypted session key to a key manager associated with the second node.

8. The computer-readable medium of claim 6, wherein the session key is a symmetric session key associated with a persistently secure data exchange session between the first and the second nodes.

9. The computer-readable medium of claim 6, wherein the second node is distinct from the plurality of nodes.

* * * * *

UNITED STATES PATENT AND TRADEMARK OFFICE
CERTIFICATE OF CORRECTION

PATENT NO.        : 9,800,556 B2
APPLICATION NO.   : 14/610869
DATED             : October 24, 2017
INVENTOR(S)       : Steeves et al.

Page 1 of 1

It is certified that error appears in the above-identified patent and that said Letters Patent is hereby corrected as shown below:

In the Claims

In Column 21, Line 17, in Claim 2, after "method", delete "system"

Signed and Sealed this
Twenty-eighth Day of May, 2019

Andrei Iancu
*Director of the United States Patent and Trademark Office*